United States Patent
Jeon et al.

(10) Patent No.: US 8,523,558 B2
(45) Date of Patent: Sep. 3, 2013

(54) INJECTION MOLD

(75) Inventors: Jae Ho Jeon, Changwon-si (KR); Si Young Choi, Gimhae-si (KR)

(73) Assignee: Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 13/502,525

(22) PCT Filed: May 17, 2011

(86) PCT No.: PCT/KR2011/003642
§ 371 (c)(1),
(2), (4) Date: Apr. 17, 2012

(87) PCT Pub. No.: WO2011/145869
PCT Pub. Date: Nov. 24, 2011

(65) Prior Publication Data
US 2013/0052296 A1    Feb. 28, 2013

(30) Foreign Application Priority Data

May 20, 2010    (KR) .................. 10-2010-0047523

(51) Int. Cl.
*B29C 45/73*    (2006.01)
(52) U.S. Cl.
USPC ............ 425/547; 264/334; 425/552; 425/556

(58) Field of Classification Search
USPC .................. 425/547, 552, 556; 264/334, 335, 264/336
See application file for complete search history.

(56) References Cited

U.S. PATENT DOCUMENTS 5,565,223 A * 10/1996 McCready et al. ............ 425/556
7,008,216 B2 * 3/2006 Fukushima .................... 425/556

* cited by examiner

*Primary Examiner* — Tim Heitbrink
(74) *Attorney, Agent, or Firm* — Julio M. Loza; Loza & Loza, LLP (57) ABSTRACT

An injection mold (1) may include: an outer block (100) that is mounted and fixed to an injection molding machine and divided into an upper mold (110) and a lower mold (120), an inner block (200) composed of an upper block (230) and a lower block (220) that are replaceably mounted on the upper mold (110) and the lower mold (120), respectively; a metal core (300) mounted in the inner block (200) and has a cavity (310) for forming a molded product (10) with a molded portion having a size of tens to hundreds of micrometers; an ejector (400) coupled to the inner block (200) and removes the molded product (10) in the cavity (310) by moving straight; a driving unit (500) disposed inside the lower mold (120) is moved up/down by hydraulic pressure or pneumatic pressure supplied from the outside, and drives the ejector (400).

12 Claims, 5 Drawing Sheets

INJECTION MOLD

CROSS-REFERENCE TO RELATED APPLICATIONS

This application is the U.S. national stage of International Patent Application No. PCT/KR2011/003642, filed on May 17, 2011, which claims the benefit of priority from Korean Patent Application No. 10-2010-0047523, filed May 20, 2010. The disclosures of the foregoing applications are incorporated herein by reference in their entirety.

TECHNICAL FIELD

The present invention relates to an injection mold.

BACKGROUND ART

In general, injection molding is a process of manufacturing various plastic products by putting and melting usually a raw material of thermoplastic resin in an injection cylinder of an injection molding machine, forcing the molten resin into the cavity of a metal mold with a hydraulic plunger or the screw of an extruder, and cooling and hardening the molten resin therein, in which the metal mold used in the injection molding is called an injection mold.

The injection mold is manufactured to correspond to the size and shape of a product that is injection molded, and replaceably mounted so that various products can be injection molded from the same injection molding machine.

Meanwhile, when the size of a molded product is small, the injection mold disclosed in Korean Patent Registration No. 10-0344901 is used for injection molding.

According to the injection mold disclosed in Korean Patent Registration No. 10-0344901, an upper core and a lower core are disposed between an upper holder block and a lower holder block and an ejector is disposed under the lower holder block.

Accordingly, the molded product formed in the cavity formed by the upper core and the lower core can be separated from the mold by an ejecting pin moving into the cavity, through the lower holder block and the lower core.

However, the related art having the configuration described above has the following problems.

A piezoelectric ceramic product for a piezoelectric polymer composite is molded in a shape between several micrometers (μm) and several millimeters (mm). Further, in order to mold a piezoelectric ceramic product for a piezoelectric polymer composite, one piezoelectric ceramic product can be formed by injecting a material after manufacturing a plastic mold and then melting the plastic mold after molding is finished.

Therefore, in order to mold a plurality of piezoelectric ceramic products, it is required to manufacture plastic molds that are as many as the products. This increases the manufacturing cost and the manufacturing time, which consequently makes mass production difficult.

Further, when the piezoelectric ceramic is molded by a common injection mold, there is a portion with a large aspect ratio for the characteristics of the injection-molded piezoelectric ceramic. The aspect ratio of the ejecting pin for removal is correspondingly increased to mold the portion with a large aspect ratio, so that the ejecting pin has a thin and long shape.

Further, when the injection mold described above is mounted on a large and high-capacity injection molding machine that is generally used, the lower holder block becomes very thick with respect to the size of the upper core and the lower core while molding for a micro-sized shape, so that the length of the ejecting pin passing through the lower holder block is necessarily increased.

In this structure, since the ejecting pin is long and thin, it may be deformed or broken due to the load that is vertically applied, which causes a defect in the product.

In particular, when not only the size of a piezoelectric ceramic product that is injection molded is small, but a complex shape, such as a groove, a slot, and a hole, is to be molded, the ejecting pin becomes necessarily thinner and accurate, so that the problem described above becomes more serious.

Obviously, although it may be possible to produce accurately machined ejecting pin by using a high-strength material in order to remove the problem, the manufacturing cost considerably increases, which is not preferable.

DISCLOSURE OF INVENTION

Technical Problem

The object of the present invention is to provide an injection mold that makes it possible to minimize the length of an ejecting pin, by being provided with a replaceable inner block inside an outer block, an ejector for removing a molded product at the inner block, and a driving unit for driving the ejector at the outer block.

Solution to Problem

The injection mold, used for forming a molded product that has a size of hundreds of micrometers to several millimeters and a molded portion having an aspect ratio of 5 to 20, includes: an outer block that is mounted and fixed to an injection molding machine and divided into an upper mold and a lower mold; cooling water ports that are formed at the outer block and through which cold water or hot water supplied from the outside circulates inside the outer block and controls the temperature of the outer block; an inner block that is replaceably coupled to the upper mold and the lower mold and composed of an upper block and a lower block; a metal core that is detachably mounted in the inner block and has a cavity for forming a molded product with a molded portion having a size of tens to hundreds of micrometers; an ejector that is disposed under the inner block and removes the molded product in the cavity by moving straight; and a driving unit that is disposed under the ejector, moved up/down by hydraulic pressure or pneumatic pressure supplied from the outside, and drives the ejector, in which the outer block includes: an upper plate that is mounted on the injection molding machine; an upper frame that forms the lower portion of the upper mold by being combined with the upper plate and has the bottom repressed to accommodate the upper block; a lower frame that forms the upper portion of the lower mold and has the top recessed to accommodate the lower block and the ejector; and a lower plate that is composed of a base mounted and fixed to the injection molding machine and an extender extending upward from both sides of the base plate and coupled to the bottom of the lower frame, so that a space accommodating the driving unit is formed between the lower frame and the base plate, the ejector includes: an ejecting plate that is disposed between the lower block and the lower mold to move up/down; an ejecting pin that is mounted on the ejecting plate and pushes up the molded product while moving up/down with the ejecting plate; a plurality of sub-ejecting pins that is disposed on the ejecting plate around the ejecting pin and pushes up the outer side of the molded product through the metal core; and elastic members that are disposed between the lower block and the ejecting plate and provide elastic force to the ejecting plate, and the driving unit includes: a driving unit plate that is moved up/down by hydraulic pressure or pneumatic pressure supplied from the outside; a push rod that is mounted and fixed to the center of the driving unit and extends to selectively push the bottom of the ejector; a stroking block that is replaceably disposed on the top of the driving unit plate and limits upward movement of the driving unit plate in contact with the lower frame when the driving unit moves up; and driving unit elastic members that are disposed between the driving unit plate and the lower frame and provide elastic force to the driving unit plate.

Further, the metal core is replaceably mounted on the top of the lower block.

Further, a cutting member that cuts the complete molded product by moving up/down is disposed in the inner block.

Further, the cutting member is elastically supported by a first elastic member between the upper mold and the inner block.

Further, a first injection channel and a second injection channel that form a channel for a material injected from the outside of the inner block in contact with each other are formed on the upper block and the lower block, respectively.

Further, the second injection channel is repressed at the edge of the top of the lower block and at the metal core, and the first injection channel is formed on the bottom of the upper block and repressed to connect the second injection channels.

Further, the ejector further has an ejector guide that is fastened to the lower block through the ejecting plate and guides movement of the ejecting plate.

Further, the ejecting pin is inserted in the cavity of the metal core and pushes up the molded product in the cavity.

Further, the lower frame further has a through hole through which a portion of the driving unit moves in/out.

Further, the push rod passes through the stroking block.

Further, the driving unit plate includes: a first plate disposed at the lower portion and supporting the push rod; and a second plate disposed on the top of the first plate and fixing the push rod that passes through the second plate.

Further, the first plate and the second plate are separable, so that the push rod is replaceable.

Advantageous Effects of Invention

The injection mold is configured such that an inner block is separably mounted on an outer block mounted on an injection molding machine and a metal core having a cavity is mounted inside the inner block. Further, the inner block is equipped with an ejector for removing a molded product in the cavity from the mold. Further, the outer block is equipped with a driving unit for driving the ejector.

Therefore, the ejector can be disposed at the inner block and moved by operation of the driving unit, making it possible to remove the molded product in the cavity. An ejecting pin disposed at the ejector is disposed in the inner block and can be driven by the driving unit, making it possible to reduce the actual length.

Therefore, since it is possible to reduce the aspect ratio of the ejecting pin when removing a product having a size of hundreds micrometers to several millimeters, it is possible to prevent the ejecting pin from being deformed or broken by vertical load.

Further, since the molded product is removed by the short ejecting pin, it is possible to improve convenience in removal and increase productivity.

Further, since the driving unit is disposed at the outer block, it is possible to remove the molded product, with the inner block mounted, without removing the inner block. Therefore, it is possible to perform continuous molding and removing, which can consequently improve productivity.

Further, since the ejecting pin is mounted integrally with the inner block, the ejecting pin corresponding to the inner block is replaced only once together with the replacement of the inner block. Therefore, it does not require specific measures due to replacement of the inner block, making rapid work possible.

Further, since the stroke of the driving unit is controlled by replacing the stroking block of the driving unit, the present invention can be applied to ejecting pins having various lengths.

BRIEF DESCRIPTION OF DRAWINGS

The above and other objects, features and advantages of the present invention will become apparent from the following description of preferred embodiments given in conjunction with the accompanying drawings, in which.

MODE FOR THE INVENTION

Hereinafter, specific embodiments of the present invention are described in detail with reference to the accompanying drawings. However, the scope of the present invention is not limited to the embodiments but other retrogressive inventions or other embodiments included in the scope of the present invention can be easily proposed by adding, modifying or removing other components.

Figure 1:
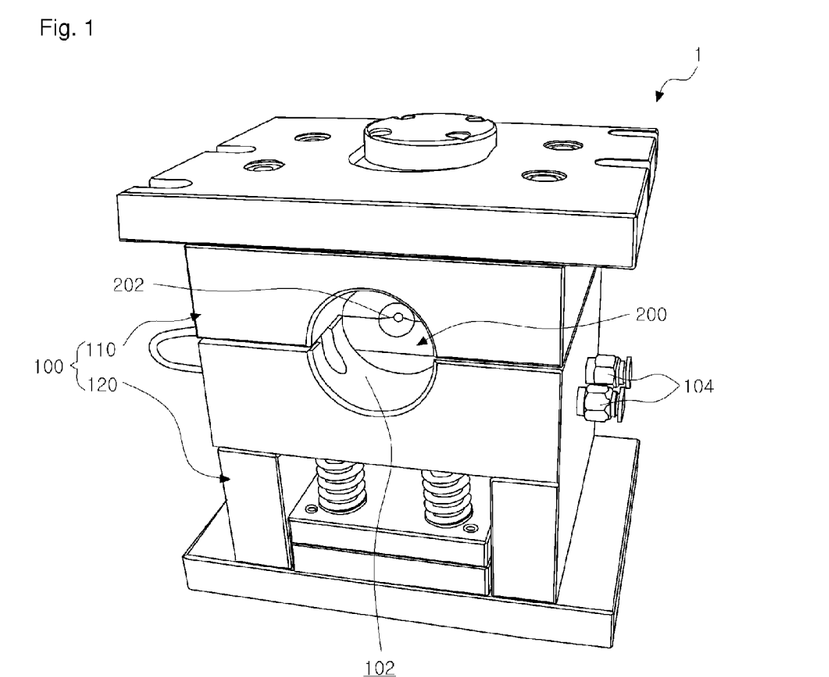
FIG. 1 is a perspective view of an injection mold according to an embodiment.

FIG. 1 is a perspective view of an injection mold according to an embodiment.

Referring to FIG. 1, an injection mold 1 according to an embodiment includes an outer block 100 mounted and fixed on a common injection molding machine (not shown), an inner block 200 separably mounted inside the outer block 100, and a metal core 300 mounted in the inner block 200.

The outer block 100 can be divided into an upper mold 110 and a lower mold 120. Further, the outer block 100 is separably mounted on the injection molding machine. The outer blocks 100 come in close contact with each other when an injection-molded product 10 is formed, and the upper mold 110 can be moved upward when the complete molded product is removed.

Further, an inner block space where the inner block 200 is accommodated is formed inside the outer block 100. The inner block space is formed in a shape corresponding to the inner block 200, by recessing the bottom of the upper mold 110 and the top of the lower mold 120.

Therefore, the inner block 200 is mounted and fixed in the inner block space that is a closed space formed when the upper mold 110 and the lower mold 120 are combined. Further, the inner block 200 can be separated from the inner block space when the upper mold 110 and the lower mold 120 are separated.

Further, guide holes 130 are formed through the four corners of the outer block 100 and guide posts 132 are inserted in the guide holes 130. The guide posts 132 are formed vertically long and guide vertical movement of the upper mold 110 with the lower mold 120 fixed.

A nozzle inserting portion 102 that guides a nozzle of the injection molding machine to be in contact with the metal core 300 is formed at a side of the outer block 100. The nozzle inserting portion 102 is formed into a circle when the upper mold 110 and the lower mold 120 are combined, so that a sprue 202, which is described below, can be exposed to the outside through the nozzle inserting portion 102.

Cooling water ports 104 are disposed on the other side of the outer block 100. The cooling water ports 104 are formed such that cooling water or hot water can circulate inside the outer block 100. Therefore, the cooling water supplied from the outside can be discharged outside, after flowing through the inside of the outer block 100.

Figure 2:
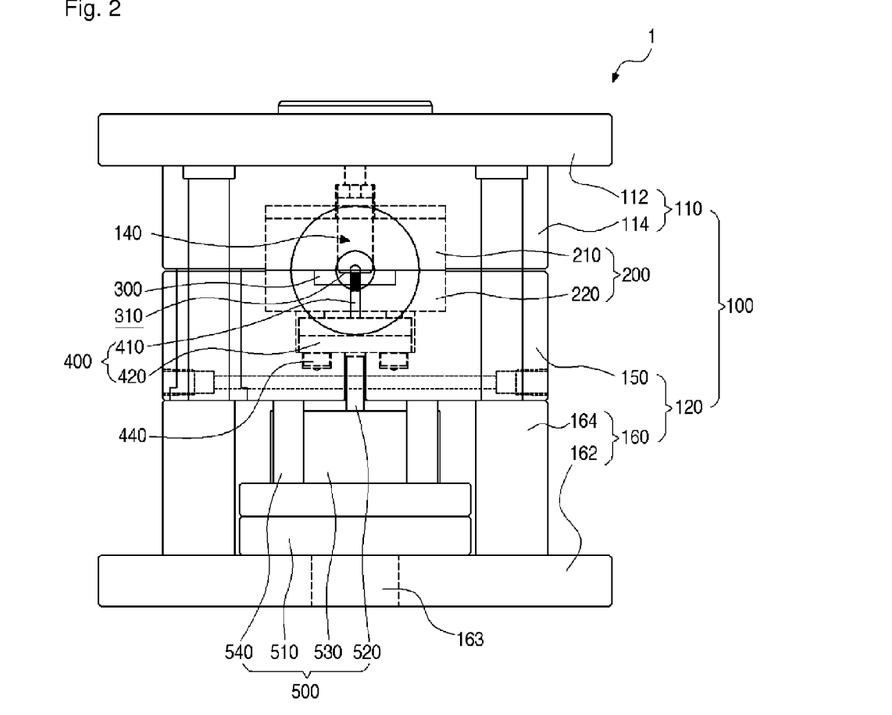
FIG. 2 is a front perspective view of the injection mold.
Figure 3:
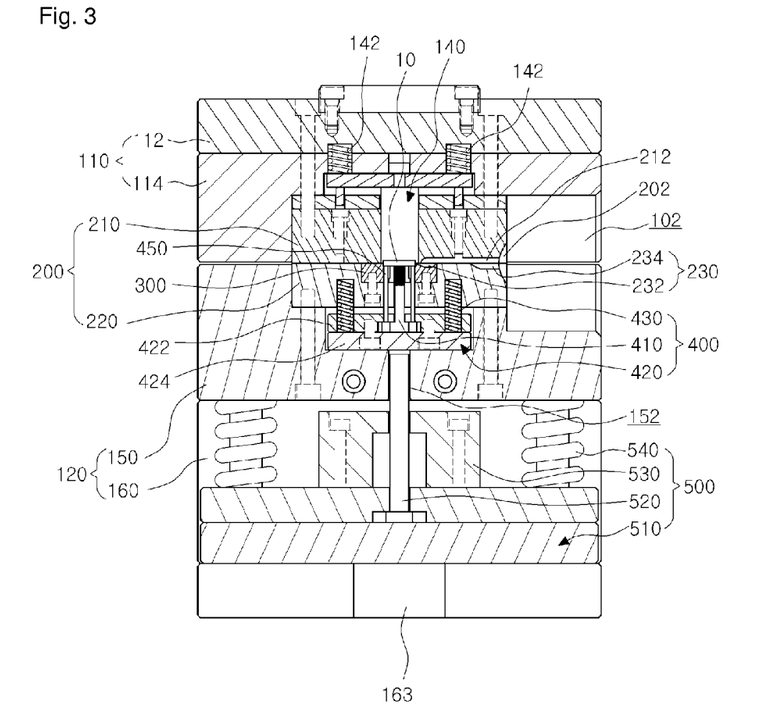
FIG. 3 is a longitudinal cross-sectional view of the injection mold.

FIG. 2 is a front perspective view of the injection mold. Further, FIG. 3 is a longitudinal cross-sectional view of the injection mold. Further, FIG. 4 is a perspective view of an upper mold according to the embodiment, seen from the bottom.

Figure 4:
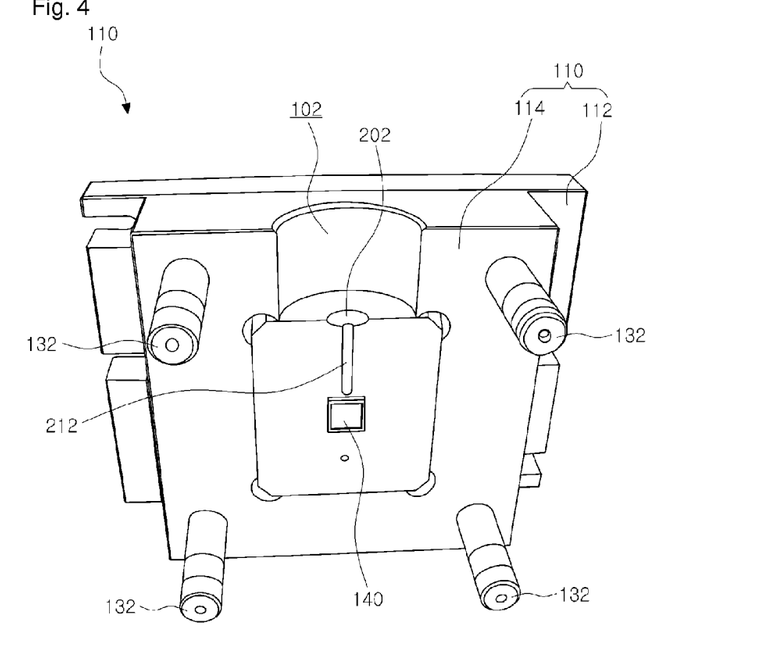
FIG. 4 is a perspective view of an upper mold according to the embodiment, seen from the bottom.

Referring to FIGS. 2 to 4, the upper mold 110 is composed of an upper plate 112 that is mounted and fixed to the injection molding machine and an upper frame 114 disposed under the upper plate 112. The upper frame 114 is formed to be able to accommodate the inner block 200, in contact with a lower frame 150, which is described below.

Further, the guide posts 132 are mounted on the four corners of the upper mold 110. The guide posts 132 can be inserted into the guide holes 130 from under the upper frame 114.

The upper frame 114 is provided with an upper block 210 that forms the top of the inner block 200. The upper block 210 is inserted from under the upper frame 114. Further, the bottom of the upper block 210 may be arranged on the same plane as the bottom of the upper frame 114. The upper block 210 is replaceably mounted inside the upper frame 114, so that various molded products 10 can be formed by replacing the upper block 210.

Further, the nozzle inserting portion 102 is formed at a side of the upper frame 114. The nozzle inserting portion 102 is recessed in a semicircular shape and formed in a circle, with the upper frame 114 and the lower frame 150 in contact.

Meanwhile, the upper frame 114 has a cutting member 140. The cutting member 140 is disposed inside the upper frame 114 and protrudes above the upper block 210 through the upper block 210. The cutting member 140 can move up/down and can be elastically supported by a cutting member elastic member 142.

The lower end of the cutting member 140 is exposed under the bottom of the upper frame 114, and in detail, the bottom of the upper block 210, and can cut the unnecessary portion of the material when the molded product 10 is completely molded, by pressing the cavity 310 of the metal core 300.

Further, a first injection channel 212 that guides injection of a material for molding into the cavity 310 is recessed on the bottom of the upper block 210. The first injection channel 212 extends from the sprue 202 to the position corresponding to the end of the cavity 310.

Further, with the upper block 210 and the lower block 220 in contact with each other, the first injection channel 212 is connected with a second injection channel 230 formed on the lower block 220, so that the material supplied through the sprue 202 can be guide into the cavity 310.

Figure 5:
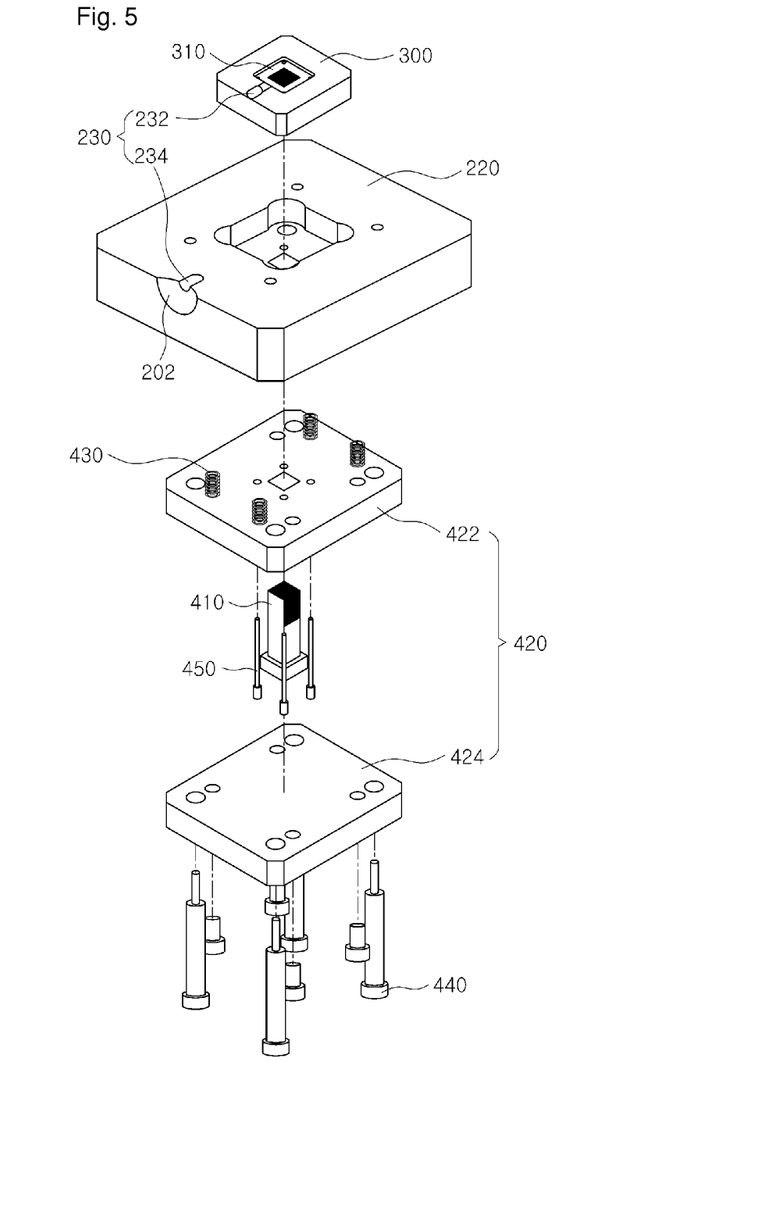
FIG. 5 is an exploded perspective view showing the structure of a lower block according to the embodiment.

FIG. 5 is an exploded perspective view showing the structure of a lower block according to the embodiment. Further, FIG. 6 is a perspective view of a lower mold according to an embodiment, seen from above.

Figure 6:
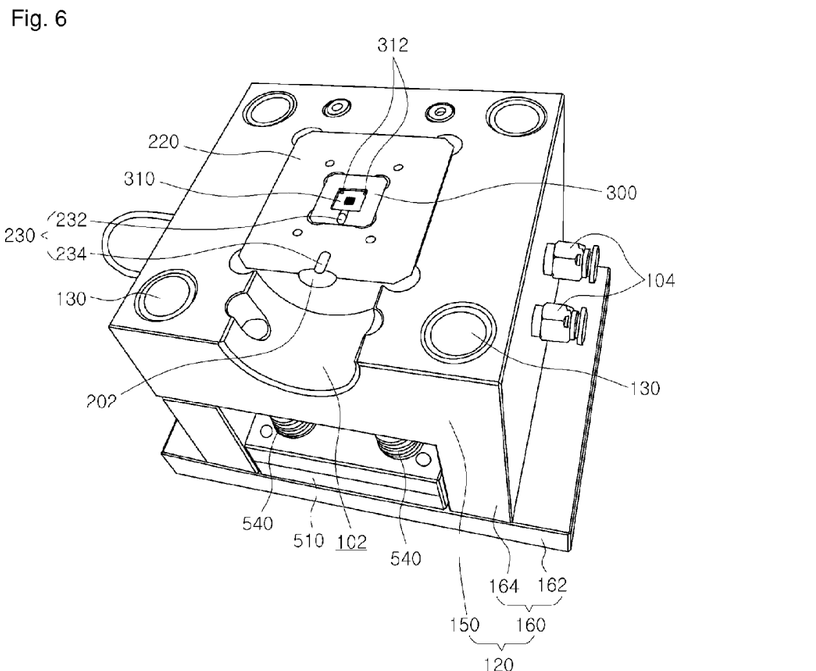
FIG. 6 is a perspective view of a lower mold according to an embodiment, seen from above.

Referring to FIGS. 5 and 6, the lower mold 120 is composed of a lower frame 150 and a lower plate 160. The lower frame 150 forms the upper shape of the lower mold 120, so that the lower block 220 of the inner block 200 can be accommodated.

In detail, the lower frame 150 is formed in a shape corresponding to the upper frame 114 and defines a space where the inner block 200 is accommodated, in contact with the lower frame 150. Further, the lower plate 160 is mounted and fixed to the injection molding machine, under the lower frame 150.

The inner block 200 has a substantially rectangular parallelepiped shape and may include the upper block 210 and the lower block 220. The lower block 220 is positioned under the upper block 210 to correspond to the upper block and comes in contact with the upper block 210 when the upper mold 110 is moved down.

The metal core 300 is disposed in the lower block 220. The metal core 300 is a member that defines the cavity 310 that is a space where the molded product 10 is formed, and is replaceably mounted in the lower block 220. The metal core 300 is mounted on the lower block 220 and can be replaced together with the lower block 220, when another shape of molded product is manufactured. Further, the metal core 300 may only be replaced if necessary. In this case, the cutting member 140 of the upper mold 110 may also be replaced.

The metal core 300 is seated inside the lower block 220. Further, when the metal core 300 is seated, the top of the metal core 300 and the top of the lower block 220 are positioned on the same plane.

The cavity 310 where the molded product 10 is made is formed at the substantially center portion of the metal core 300. The cavity 310 is a space where the material is injected and the molded product 10 is formed, and may be variously formed in accordance with the shape of the molded product 10.

Figure 7:
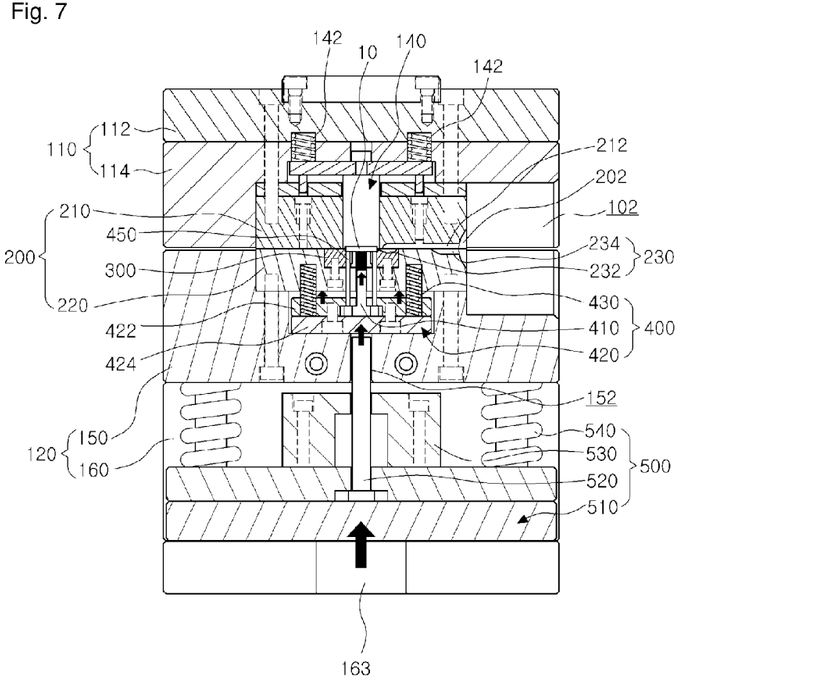
FIGS. 7 and 8 are views illustrating the operation of the injection mold.
Figure 8:
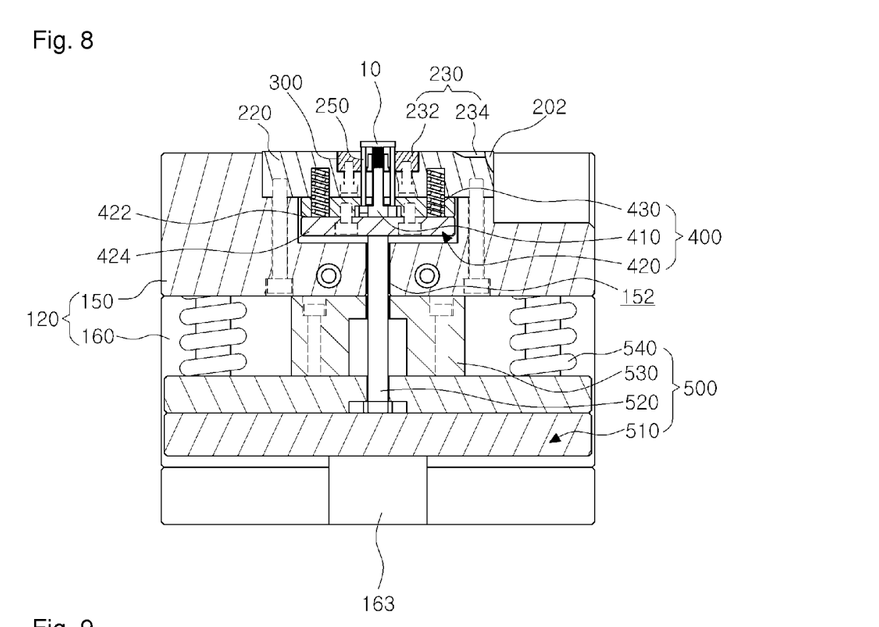

For example, the molded products 10 that are used for piezoelectric elements are formed to have a tens to hundreds of micrometer-sized molding portion 11, in which the aspect ratio of the molding portion 11 is about 5 to 20. For example, the molded product 10 may be formed to have a plurality of protrusions or the plate-shaped molding portion 11, as shown in FIGS. 7 and 8.

In this case, when the aspect ratio is smaller than 5, the molded product can be removed after being molded in a common mold, and when the aspect ratio is larger than 20, the ejector pin may be damaged while removing the molded product.

Therefore, a plurality of holes is formed such that the cavity 310 has a shape corresponding to the forming portion. Further, ejecting pins 410 that are described below may be inserted in the holes, so that the molded product 10 can be removed by the ejecting pins 410.

Meanwhile, pin holes 312 where sub-ejecting pins 450, which are described below, are further formed outside the holes of the cavity 310. The pin holes 312 are formed at the four corners inside the cavity 310, so that the sub-ejecting pins 450 push up the four corners of the molded product 10 through the pin holes 312.

Further, the second injection channel 230 is recessed on the lower block 220. The second injection channel 230 is formed apart from a side of the lower block 220 and a side of the metal core 300 and forms a channel through which the material moves, in contact with the first injection channel 212, with the upper mold 110 and the lower mold 120 in contact.

The second injection channel 230 is composed of a block channel 232 and a core channel 234. The block channel 232 is formed on the top of the lower block 220 and extends toward the center of the lower block 220, at a side of the sprue 202. The block channel 232 extends to the outside, apart from the metal core 300.

Further, the core channel 234 is formed on the top of the metal core 300, outside the cavity 310, and extends to the cavity 310. Therefore, the material flowing through the first injection channel 212 can be supplied to the cavity 310 through the core channel 234.

Further, the ends of the first injection channel 212 and the second injection channel 230 are connected with the sprue 202 formed on the outer surface of the inner block 200. Therefore, the material injected through the nozzle can be supplied into the cavity 310 through the first injection channel 212 and the second injection channel 230.

Further, the sprue 202 is exposed to the outside through the nozzle inserting portion 102 of the outer block 100, when the metal core 300 is mounted on the inner block 200 and the inner block 200 is mounted on the outer block 100.

Meanwhile, an ejector 400 is mounted under the lower block 220. The ejector 400 is provided to remove the molded product 10 when molding of the molded product 10 is finished, and is coupled to the lower block 220. Further, the lower block 220 is mounted on the lower frame 150, with the ejector 400 mounted, and the lower frame 150 is formed, so that the lower block 220 with the ejector 400 mounted can be accommodated. Therefore, the ejector 400 can be replaced in one set together with the lower block 220, in accordance with the type of the molded product 10.

Further, the ejector 400 includes an ejecting pin 410 that is inserted in the metal core 300 and removes the molded product 10, an ejecting plate 420 where the ejecting pin 410 is seated, and elastic members 430 that provide elastic force to the ejecting plate 420.

In more detail, the ejecting pin 410 is mounted on the ejecting plate 410 to be moved up/down with the ejecting plate 420. Further, when the ejecting plate 420 is moved up/down, at least a portion of the ejecting pin 410 pushes up the molded product 10 through the metal core 300. The ejecting pin 410 is separably mounted on the ejecting plate 420 and can be replaced with another ejecting pin 410 in accordance with the shape of the molded product 10.

The ejecting pin 410 may be variously formed in accordance with the shape of the molded product 10 and is formed such that a plurality of plate or pin shapes is continuously arranged to remove the molded product 10 shown in the figures.

A plurality of sub-ejecting pins 450 is disposed around the ejecting pin 410. The sub-ejecting pins 450 are formed vertically long, and mounted and fixed to the ejecting plate 420. Further, when the ejecting plate 420 is moved up, the sub-ejecting pins pushes the molded product 10 with the ejecting pin 410, protruding through the four corners of the cavity 310 when the molded product 10 is removed.

Meanwhile, the ejecting plate 420 is disposed inside the lower frame 150 and can be moved up/down while being coupled to the lower block 220. Further, the ejecting plate 420 is composed of a first ejecting plate 422 and a second ejecting plate 424, and the first ejecting plate 422 and the second ejecting plate 424 are separably combined by fasteners, such as pins or screws.

Further, the ejecting pin 410 and the sub-ejecting pins 450 are fixed between the first ejecting plate 422 and the second ejecting plate 424, and the ejecting pin 410 and the sub-ejecting pins 450 can be replaced when the first ejecting plate 422 and the second ejecting plate 424 are separated.

Further, the ejecting plate 420 can be guided up/down by ejector guides 440 coupled to the lower block 200 through the ejecting plate 420.

Further, the elastic members 430 are disposed between the lower block 220 and the ejecting plate 420. The elastic members 430 are implemented by members that can supply elasticity such as springs, and two elastic members are disposed at each of the left and right sides to uniformly supply elastic force.

Therefore, as the ejecting plate 420 is moved up by a driving unit 500 that is described below, the ejecting pin 410 and the sub-ejecting pins 450 can remove up the molded product 10 in the cavity 310, and when external force is removed, the ejecting plate 420 is moved down by the elastic members 430 and returns to the initial position.

Meanwhile, a through-hole 152 is formed at the substantially center portion of the lower frame 150. The through-hole 152 is formed such that a push rod 520 of the driving unit 500 which is described below can be inserted. Further, the push rod 520 that moves up/down through the through-hole 152 can push the ejecting plate 420 under the ejecting plate 420 to be moved up/down.

The lower plate 160 is disposed under the lower frame 150. The lower plate 160 is mounted on the injection molding machine and fixes the lower mold 120, and is combined with the lower frame 150 from under the lower frame 150. Further, a power supplier 163 where hydraulic pressure or pneumatic pressure for moving up/down the driving unit 500 is supplied is disposed at the center of the lower frame 150.

Meanwhile, the lower plate 160 is composed of a plate-shaped base 162 fixed to the injection molding machine and an extender 164 extending up from both sides of the base 162. The extender 164 is coupled to the bottom of the lower frame 150 and a space where the driving unit 500 can be disposed is formed between the lower frame 150 and the lower plate 160 by the extender 164.

The driving unit 500 is provided to drive the ejector and driven by hydraulic pressure or pneumatic pressure supplied through the power supplier 163. The driving unit 500 may include a driving unit plate 510, the push rod 520, a stroking block 530, and driving unit elastic members 540.

In detail, the driving unit plate 510 is formed in a plate shape and disposed in the space between the lower frame 150 and the lower plate 160 to be able to move up/down. The driving unit plate 510 is in contact with the extender 164 of the lower plate 160, at both left and right sides, and can be guided up/down by the extender 164.

Further, the driving unit plate 510 is composed of a first plate 512 and a second plate 514. The second plate 514 is in contact with the base 162 of the lower plate 160 and the first plate 512 overlaps the top of the second plate 514 and is fixed thereto.

Further, the push rod 520 is supported on the second plate 514 and is fixed by the first plate 512. The push rod 520, a bar having a predetermined length, has the lower end fixed to the driving unit plate 510 and the upper portion inserted in the through-hole of the lower frame 150.

Therefore, the push rod 520 moves up/down with the driving unit plate 510 that moves up, and can push up the ejecting plate 420 through the through-hole 152.

Meanwhile, the driving unit plate 510 is further provided with the stroking block 530. The stroking block 530 is provided to limit the up-down movement distance of the driving unit plate 510 and disposed substantially at the center portion of the driving unit plate 510, with a predetermined height.

The center portion of the stroking block 530 is bored such that the push rod 520 can extend up through the center portion of the stroking block 530, thereby allowing the stroking block 530 to guide the up-down movement of the push rod 520 while preventing the push rod 520 from buckling.

Further, the stroking block 530 may be replaced with another one having a different height to control the length of the push rod 520 or the up-down movement distance of the driving unit plate 510. That is, any one of the stroking blocks 530 having various heights is mounted for use on the driving unit plate 510, in accordance with use conditions.

Meanwhile, the driving unit elastic members 540 are disposed between the driving unit plate 510 and the lower frame 150. Two driving unit elastic members 540 are disposed at each of the left and right sides, with both ends in contact with the top of the driving unit plate 510 and the top of the lower frame 150.

Therefore, as external force is applied to the driving unit plate 510, the driving unit elastic members 540 are compressed and the driving unit plate 510 is moved up; whereas when the external force is removed, the driving unit plate 510 is moved down by the elastic restoring force of the elastic members 430.

Hereinafter, the operation of the injection mold having the above configuration according to the present invention is described through an embodiment.

FIGS. 7 and 8 are views illustrating the operation of the injection mold.

Referring to FIGS. 1 to 8, first, the metal core 300 corresponding to the shape of a desired molded product 10 is provided and mounted on the lower block 220 in order to manufacture the molded product 10. Further, the ejector 400 with the ejecting pins 410 corresponding to the metal core 300 is coupled to the lower block 220. Meanwhile, the driving unit 500 that drives the ejector 400 is coupled to the lower mold 120. Further, the lower block 220 equipped with the metal core 300 and the ejector 400 is mounted and fixed to the lower frame 150.

Meanwhile, the cutting member 140 corresponding to the cavity 310 of the metal core 300 is mounted inside the upper frame 114 of the upper mold 110. After preparing the upper mold 110 and the lower mold 120 is finished, preparation for molding is finished by mounting the upper mold 110 and the lower mold 120 on the injection molding machine.

With the upper mold 110 and the lower mold 120 combined, the sprue 202 is exposed to the outside and the nozzle of the injection molding machine is in contact with the sprue 202 so that a material for forming the molded product 10 can be injected. In this configuration, the material may be implemented by a polymer or a composite of ceramic and a binder.

In detail, the material in the embodiment of the present invention is implemented by sample powder of ceramic or metal and an organic binder for improving molding performance. The ratio of the sample powder and the binder depends on the molding performance of the molded product 10. When the ratio of the sample powder and the binder is unnecessarily high, the molding performance is significantly decreased, while in the opposite case, the intrinsic properties of the material becomes deteriorated and it is difficult to keep the molding performance after removing grease.

The material injected through the sprue 202 moves through the first injection channel 212 and the second injection channel 230 so that the material can be injected into the cavity 310 formed in the metal core 300. After the injection of the material in the cavity 310 is finished, the material filled in the cavity 310 is hardened and the molded product 10 is formed, in which cooling water or hot water may be circulated through the cooling water ports 104 to contribute to hardening the material.

After the molded product 10 is formed, the cutting member 140 is moved down for cutting so that the material remaining outside the cavity 310 and in the second injection channel 230 and the molded product 10 in the cavity 310 can be separated. Next, the upper mold 110 and the lower mold 120 are separated and the molded product 10 in the cavity 310 is prepared to be removed.

In this state, as hydraulic pressure or pneumatic pressure is supplied through the power supplier 163 and presses the driving unit plate 510, the driving unit plate 510 is moved up. As the driving unit plate 510 is moved up, the driving unit elastic members 430 are compressed, and the driving unit plate 510 is moved up until the stroking block 530 comes in contact with the bottom of the lower frame 150.

The push rod 520 is also moved with the driving unit plate 510 moving up and the ejector 400 is operated by the upward movement of the push rod 520.

In detail, as the push rod 520 is moved up, the push rod 520 pushes up the ejecting plate 420, and the ejecting pin 410 and the sub-ejecting pins 450 are moved up while the elastic members 430 are compressed by the upward movement of the ejecting plate 420.

As the ejecting pin 410 moves up, the upper end of the ejecting pin 410 is inserted into the cavity 310 from under the metal core 300 and pushes up the molded product 10 formed in the cavity 310, thereby the molded product 10 can be removed from the cavity 310. Further, the sub-ejecting pins 450 also protrude above the cavity 310 through the metal core 300 and push and remove up the molded product 10.

In this operation, the elastic members 430 are compressed by the movement of the ejecting plate 420, and when the molded product 10 is removed and the external force applied to the ejecting plate 410 is removed, the ejecting plate 420, the ejecting pin 410, and the sub-ejecting pins 450 are moved to the initial positions by the elastic restoring force.

Further, when the external force applied to the driving unit 500 is removed, the driving unit plate 510 and the push rod 520 are also moved down and returned to the initial positions by the elastic restoring force of the driving unit elastic members 540. Manufacturing and removing the molded product 10 is finished by these processes.

On the other hand, in order to manufacture a molded product 10 having another shape, it is possible to manufacture the molded product 10 by assembling the inner block 200 again after replacing the metal core 300 and repeating the processes described above. Further, it may be possible to manufacture another molded product 10 by replacing not only the metal core 300, but the inner block 200 equipped with the ejector 400.

Figure 9:
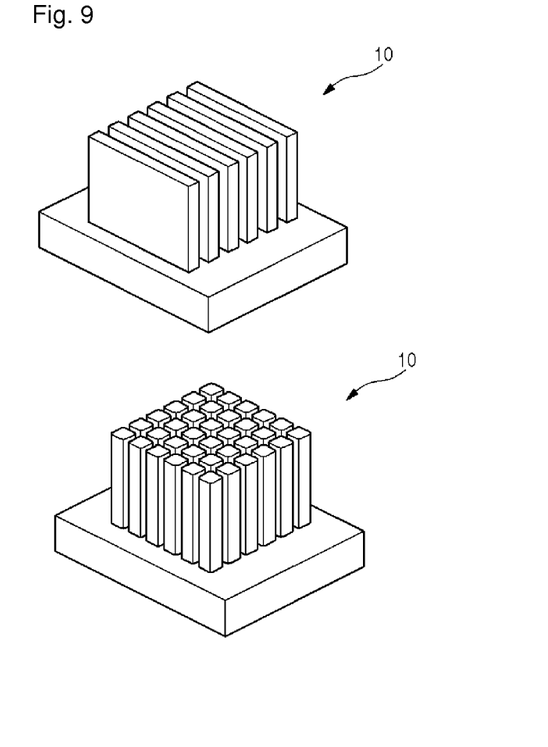
FIG. 9 is a perspective view of a molded product formed by the injection mold.

FIG. 9 is a perspective view of a molded product formed by the injection mold.

The molded product 10 that has been formed and removed by the processes described above can be formed in the shape shown in FIG. 9.

Referring to FIG. 9, a 2-2 type of molded product 10 for a piezoelectric composite may be formed, as in the figure. The molded product 10 has a thickness of hundreds of μm and a shape in which a plurality of plates having heights larger than the horizontal lengths are continuously arranged.

For example, the molded product 10 is transversely about 1 mm long and longitudinally 5 mm or more long, so that the molded product 10 having an aspect ratio of 5 is formed. Though different in accordance with the types and shapes of products, the molded product 10 has a size of about tens of micrometers to hundreds of micrometers, and its aspect ratio may be 5 to 20.

Further, the molded product 10 may be used as a piezoelectric polymer composite. For this configuration, polymers 13 are filled between the molded portions 11 of the molded product 10 and a piezoelectric polymer composite is completed by removing the cutting portion 12 that forms the lower portion of the molded product 10, after the polymer 13 is filled.

Meanwhile, the 1-3 type of molded product 10 for a piezoelectric composite may be formed by replacing the metal core 300 and the ejecting pin 410, as in the figure, and the molded product 10 can be manufactured in a shape in which a plurality of pins having a thickness of hundreds μm is arranged.

As described above, the shapes of the molded products 10 have a plurality of pin or plate shape portions of which the longitudinal length is larger than the transverse width.

Industrial Applicability

According to the embodiment, since it is possible to reduce the aspect ratio of the ejecting pin when removing a product having a shape with hundreds micrometers to several millimeters, it is possible to prevent the ejecting pin from being deformed or broken due to vertical load. Further, since the molded product is removed by a short ejecting pin, convenience in the removal of the product is improved, thereby improving productivity and boosting its industrial applicability.

The invention claimed is:

1. An injection mold for forming a molded product that has a size of hundreds of micrometers to several millimeters and a molded portion having an aspect ratio of 5 to 20 consists of the following:
    an outer block that is mounted and fixed to an injection molding machine and divided into an upper mold and a lower mold;
    cooling water ports that are formed at the outer block and through which cold water or hot water supplied from the outside circulates inside the outer block and controls the temperature of the outer block;
    an inner block that is replaceably coupled to the upper mold and the lower mold and composed of an upper block and a lower block;
    a metal core that is detachably mounted in the inner block and has a cavity for forming a molded product having a molded portion having a size of tens to hundreds of micrometers;
    an ejector that is disposed under the inner block and removes the molded product in the cavity by moving straight; and
    a driving unit that is disposed under the ejector, moved up/down by hydraulic pressure or pneumatic pressure supplied from the outside, and drives the ejector,
    wherein the outer block includes:
    an upper plate that is mounted on the injection molding machine;
    an upper frame that forms the lower portion of the upper mold by being combined with the upper plate and has the bottom repressed to accommodate the upper block;
    a lower frame that forms the upper portion of the lower mold and has the top recessed to accommodate the lower block and the ejector; and
    a lower plate that is composed of a base mounted and fixed to the injection molding machine and an extender extending upward from both sides of the base plate and coupled to the bottom of the lower frame, so that a space accommodating the driving unit is formed between the lower frame and the base plate,
    the ejector includes:
    an ejecting plate that is disposed between the lower block and the upper mold to move up/down;
    an ejecting pin that is mounted on the ejecting plate and pushes up the molded product while moving up/down with the ejecting plate;
    a plurality of sub-ejecting pins that is disposed on the ejecting plate around the ejecting pin and pushes up the outer side of the molded product through the metal core; and
    elastic members that are disposed between the lower block and the ejecting plate and provide elastic force to the ejecting plate, and the driving unit includes:
    a driving unit plate that is moved up/down by hydraulic pressure or pneumatic pressure supplied from the outside;
    a push rod that is mounted and fixed to the center of the driving unit and is extended to selectively push the bottom of the ejector;
    a stroking block that is replaceably disposed on the top of the driving unit plate and limits upward movement of the driving unit plate in contact with the lower frame when the driving unit moves up; and
    the driving unit elastic members that are disposed between the driving unit plate and the lower frame and provide elastic force to the driving unit plate.

2. The injection mold according to claim 1, wherein the metal core is replaceably mounted on the top of the lower block.

3. The injection mold according to claim 1, wherein a cutting member that cuts the complete molded product by moving up/down is disposed in the inner block.

4. The injection mold according to claim 3, wherein the cutting member is elastically supported by a first elastic member between the upper mold and the inner block.

5. The injection mold according to claim 1, wherein a first injection channel and a second injection channel that form a channel for a material injected from the outside of the inner block in contact with each other are formed on the upper block and the lower block, respectively.

6. The injection mold according to claim 5, wherein the second injection channel is repressed at the edge of the top of the lower block and at the metal core, and
    the first injection channel is formed on the bottom of the upper block and repressed to connect the second injection channels.

7. The injection mold according to claim 1, wherein the ejector further has an ejector guide that is fastened to the lower block through the ejecting plate and guides movement of the ejecting plate.

8. The injection mold according to claim 1, wherein the ejecting pin is inserted in the cavity of the metal core and pushes up the molded product in the cavity.

9. The injection mold according to claim 1, wherein the lower frame further has a through hole through which a portion of the driving unit moves in/out.

10. The injection mold according to claim 1, wherein the push rod passes through the stroking block.

11. The injection mold according to claim 1, wherein the driving unit plate includes:
   a first plate disposed at the lower portion, supporting the push rod; and
   a second plate disposed on the top of the first plate, fixing the push rod that passes through the second plate.

12. The injection mold according to claim 11, wherein the first plate and the second plate are separable so that the push rod can be replaced.

* * * * *